INVENTORS.
BRUNO ZILLIE
DAVID THOMAS
BY E.T. McCabe
ATTORNEY.

June 20, 1967

D. THOMAS ET AL 3,326,138

GAMBREL CLAMP

Filed Nov. 27, 1964

INVENTORS.
BRUNO ZILLIE
DAVID THOMAS
BY E.T. McCabe
ATTORNEY.

United States Patent Office 3,326,138
Patented June 20, 1967

3,326,138
GAMBREL CLAMP
David Thomas and Bruno Zillie, Calgary, Alberta, Canada, assignors to Swift & Company, Chicago, Ill., a corporation of Illinois
Filed Nov. 27, 1964, Ser. No. 414,320
4 Claims. (Cl. 104—93)

This invention relates to a clamping device. More specifically this invention is directed to an improved clamping device that is extendable to grip and hold motionless an animal carcass gambrel suspended from an overhead trolley.

In slaughter houses animal carcasses are processed extensively according to what is termed "on the rail dressing." In that procedure the animal carcasses are suspended from an overhead movable support and are either traveled continuouly or from station to station while being eviscerated and processed. Where the suspended carcasses are held at a given station for a period of time it is necessary to arrest the carcass supporting equipment to prevent motion of the carcass.

In the processing of hog carcasses, the latter are suspended from gambrels which impale the rear hocks. A gambrel is simply a rod, pointed at both ends, to penetrate the hock, held by a suspension hook at its center. For "on the rail" processing of hogs suspension hook is engaged with an eyebolt of an overhead trolley. Accordingly the gambrel upon which the hog carcass is suspended is normally free to move longitudinally of an overhead rail with the trolley, and also free to swing laterally of the rail and trolley and further free to turn with respect to the trolley. Such movements must be prevented where work is to be performed on the animal carcass.

Accordingly it is a principal object of the present invention to provide an improved clamp apparatus capable of engaging a gambrel when suspended from an overhead conveyor system and prevent the gambrel from movement in any direction.

Generally the present invention comprises a paired pantograph, or "lazy-tongs" structure supported for extension in a horizontal direction toward and away from the path of an overhead suspended gambrel, wherein the forward ends of such paired structure includes pairs of gripping jaws, and the opposite or rear end is attached to a horizontally reciprocable power source.

Further objects and advantages of the present invention will become apparent upon reading the following detailed specification in conjunction with illustrations of a preferred embodiment in the figures wherein.

Figure 1:
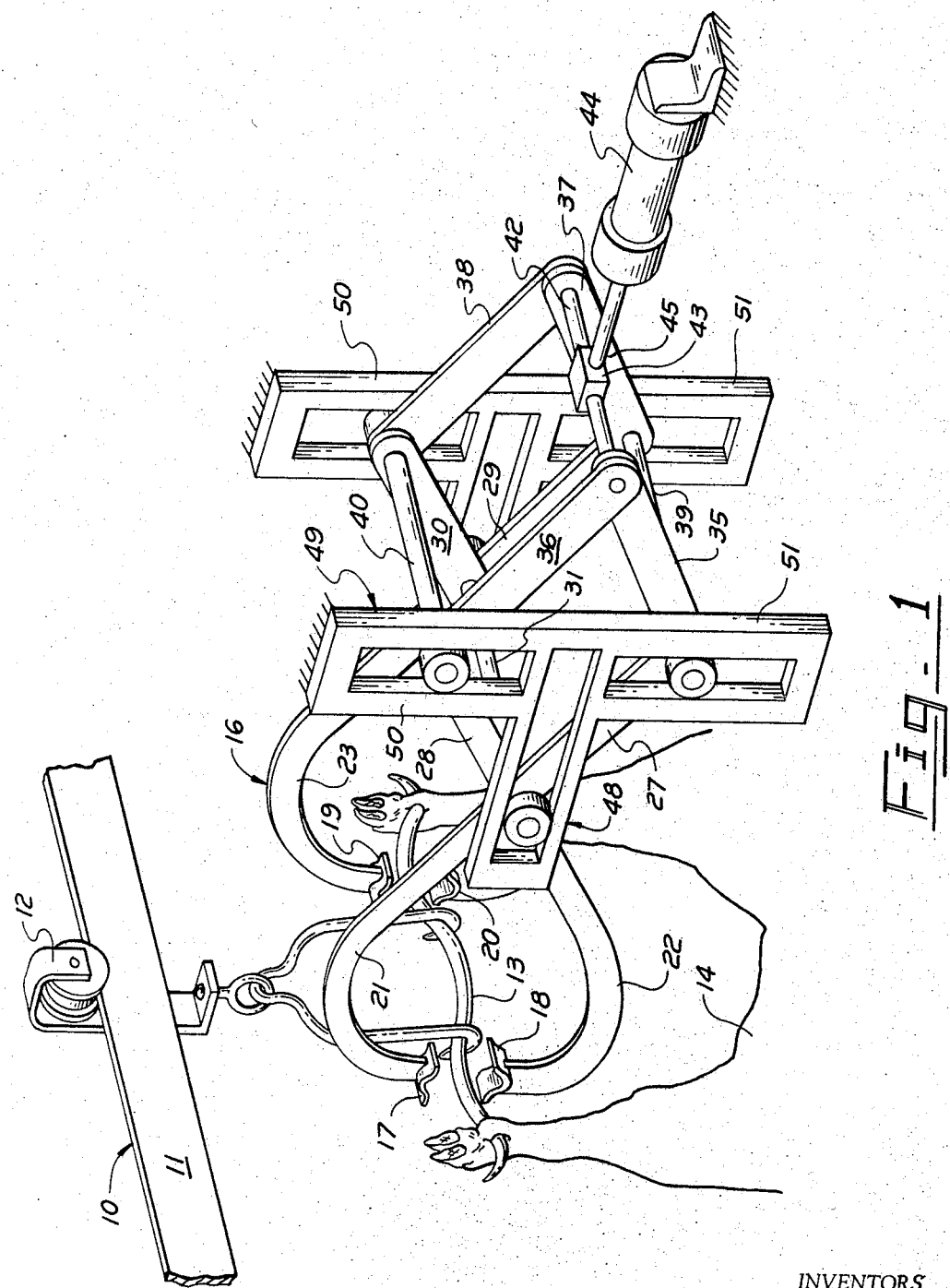
FIGURE 1 is a perspective view of a preferred embodiment of the present invention.
Figure 2:
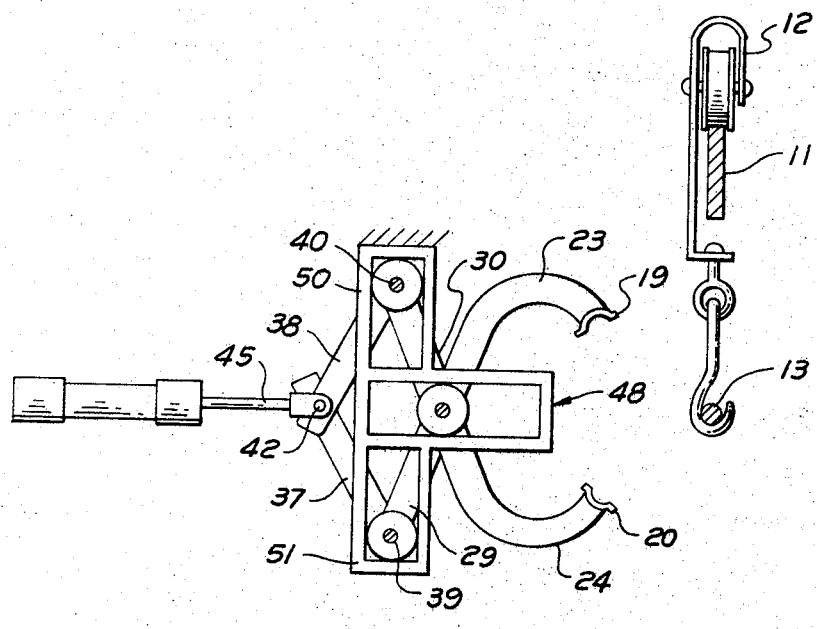
FIGURE 2 is a side elevation view of the apparatus of FIGURE 1 in an open and withdrawn position.
Figure 3:
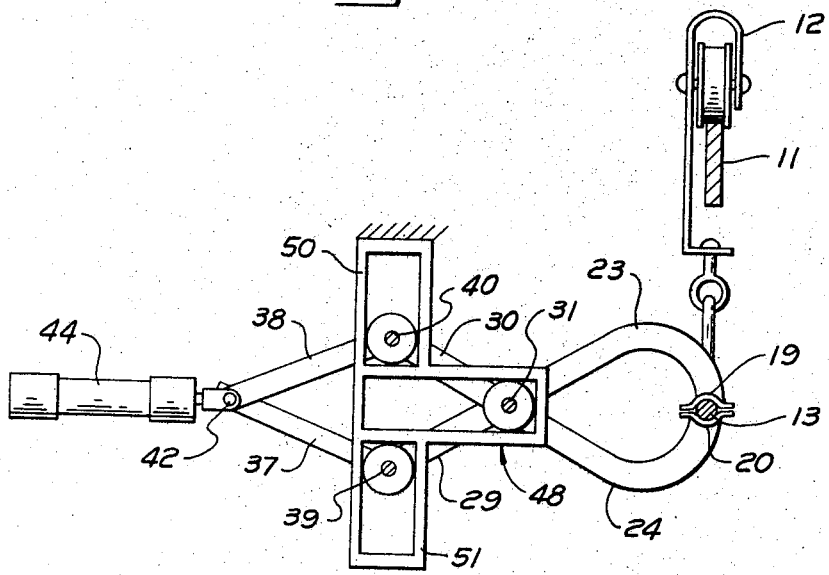
FIGURE 3 is a side elevation view of the apparatus of FIGURE 1 in a closed and extended position.

Referring specifically to the preferred embodiment of the invention illustrated in FIGURES 1 through 3, the invention is seen to apply to an overhead conveyor system, generally 10, including a rail 11, trolley 12, and gambrel 13, from which a carcass 14, is suspended. The present gambrel clamp, generally 16, comprises an upper jaw 17, and lower jaw 18, for engaging the left end of the gambrel 13 (as seen FIG. 1), and a corresponding upper jaw 19, and lower jaw 20, for engaging the right end of the gambrel. The aforementioned jaws are secured to the free ends of arcuate arms 21, 22, 23 and 24 respectively.

Each of the foregoing described jaw and arcuate arm members extends from the forward end of a pantograph type linkage or "lazy-tong" mechanism consisting of two paired sets of four links of equal length. The lower forward link 27, and upper forward link 28, of the left side set are integral with the arcuate arms 21 and 22 respectively. Similarly the lower forward link 29, and upper forward link 30, of the right hand set are integral with arcuate arms 23 and 24 respectively. The aforementioned forward links of each pantograph set are pivotally connected, and the two sets are held together in spaced relation by a common connecting forward pivot pin 31.

Each of the lower and upper forward links are pivotally connected, in turn, to rear links 35, 36, 37 and 38, by lower and upper common connecting pivot pins 39 and 40. Finally, each lower and upper rear link is pivotally connected together, and the two sets similarly joined together by a common connecting rear pivot pin 42. A mounting block 43 is supported centrally ol the rear connecting pivot pin 42, and a horizontally reciprocable means is connected thereto. The reciprocable means may be selected from several suitable mechanical devices; however it is preferred to use a pneumatic cylinder and piston 44, with piston rod 45, fastened to the block 43, because of its rapid action and ease of operation from normal high pressure air supplies found in packing plants.

The reciprocable means may be mounted to the plant structure by any suitable manner, preferably it is suspended from the ceiling structure to one side of the overhead conveyor system, generally 10. Similarly it is important that two or more of the aforementioned connecting pivot pins be slidingly supported, also preferably from the ceiling structure. The two connecting pins so supported must have a common connecting link in each set. The preferable form of support illustrated in the figures consists of a horizontal guide envelope generally 48, and a vertical guide envelope generally 49, at each side of the paired pantograph structure. The horizontal guide envelope generally 48, preferably slidingly supports the ends of the forward connecting pivot pin 31, and thus supports most of the weight of the apparatus and guides the jaw structure horizontally in line with the gambrel 13. The vertical guide envelope generally 49, should slidingly guide at least one of the upper and lower connecting pivot pins 40, 39. It is preferred that each of the latter pins be guided and upper and lower guide envelopes 50, 51 respectively, are provided for that purpose. The latter are spaced a distance from the overhead rail 11 which will permit the jaw members to extend directly beneath the rail when the pantograph structure is fully extended sufficient to bring the pairs of jaws 17–18 and 19–20 together. It will be seen that movement of the pantograph structure to each side of the vertical guide envelope, generally 49, will be symmetrical. That is the jaws will be moved with respect to the rail 11, the same distance that the rear connecting pivot pin 42, is moved by the pneumatic cylinder 44.

To operate the above-described clamping device, the pneumatic cylinder 44 is connected through a four-way valve (not shown) to a source of high pressure air and to atmosphere. An operator may then control the forward and reverse movement of piston rod 45. In operation the piston rod 45 is extended in the direction toward the vertical guide envelope 49, to horizontally collapse the pantograph structure thus causing the jaw members to be opened and withdrawn. At the time a trolley 12 and gambrel 13 reach a position on rail 11 directly opposite the clamp generally 16, the operator causes the connecting rod 45 to be withdrawn into the pneumatic cylinder 44 to thereby extend and close the jaw members upon the two opposite ends of the gambrel 13.

Obviously many modifications and variations of the invention as hereinbefore set forth may be made without departing from the spirit and scope thereof, and therefore

We claim:
1. An improved clamp apparatus for arresting a gambrel from which an animal carcass is suspended, said apparatus comprising: a pair of spaced parallel pantograph type linkages each having four equal links pivotally connected by four pins, said pins extending between corresponding pivot points on each linkage; guide means confining at least two of said pins on a common link to straight paths perpendicular to one another; a pair of jaw members on free ends of two pivotally connected links of each set of linkages; and a reciprocable means connected to the single pin pivotally connecting each remaining pair of links.

2. The apparatus of claim 1 wherein the pair of pantograph type linkages are spaced a distance sufficient to enable said pair of jaw members to engage opposite ends of a gambrel.

3. The apparatus of claim 2 in combination with an overhead rail for supporting trolleys with gambrels suspended thereon, wherein said linkages are positioned slightly below and to one side of said rail whereby said jaw members may be extended into and withdrawn from the path of a gambrel.

4. The apparatus of claim 1 wherein the reciprocable means is a pneumatic cylinder and piston, said piston being connected to said single pin.

References Cited

UNITED STATES PATENTS

| 905,010 | 11/1908 | Simmons | 294—81 X |
| 2,033,754 | 3/1936 | Carsillo | 17—24 |
| 3,055,692 | 9/1962 | Kausche | 294—81 X |
| 3,245,107 | 4/1966 | Kolman | 17—44 |

ARTHUR L. LA POINT, *Primary Examiner.*

J. E. BABER, *Assistant Examiner.*